Oct. 23, 1934.          C. B. GRAY          1,977,795
CUTTING MACHINE
Filed May 8, 1933          2 Sheets-Sheet 1

INVENTOR
CHARLES B. GRAY
BY
*R. B. Rawis*
ATTORNEY.

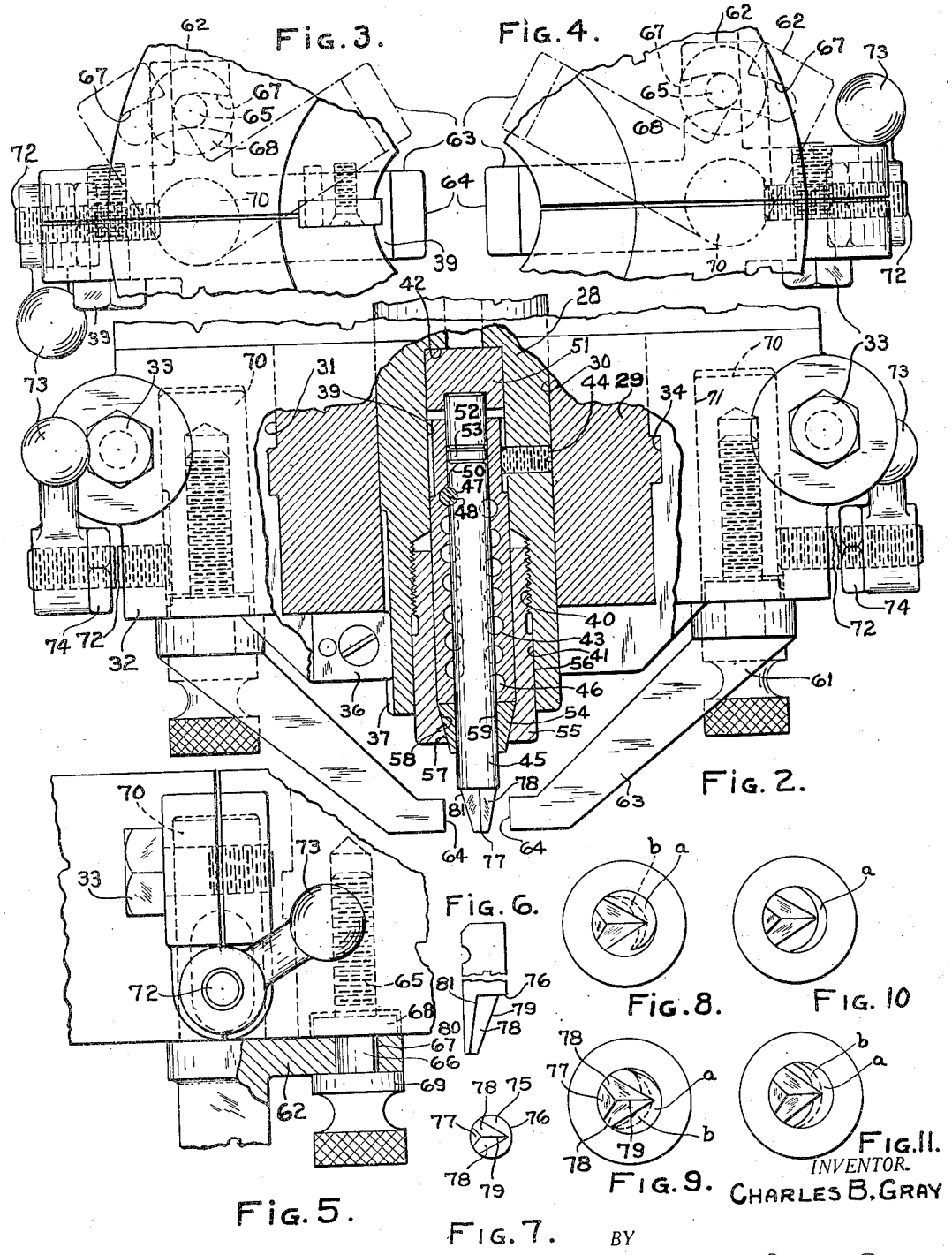

Patented Oct. 23, 1934

1,977,795

UNITED STATES PATENT OFFICE 1,977,795

CUTTING MACHINE

Charles B. Gray, Millbourne, Pa.

Application May 8, 1933, Serial No. 669,880

12 Claims. (Cl. 164—47)

My invention relates to cutting machines of the reciprocatory punch type.

An object of my invention is to provide improved means of connecting the tool to the ram and of turning the ram so that overhang of the tool with respect to the ram may be reduced to a minimum and so that the lower end of the ram may be arranged close to the lower end of the ram guide bore.

A further object of my invention is to provide improved stripping members which are swingable out of the way to give access to the tool incident to adjustment, removal or replacement of the latter.

A further object of my invention is to provide an improved tool having front cutting and back pilot portions and wherein the pilot portion is formed with a front cutting edge to bite into a slug and push portions of the latter sidewise to reduce the force of compression of the slug applied to the front of the pilot, whereby deflection of the tool is avoided.

A further object of my invention is to provide a taper seated die-holder which not only assures of correct positioning of the die but also ready release of the holder from the machine frame in order that the die may be turned.

These and other objects are effected by my invention as will be apparent from the following description and the accompanying drawings in which—

Figure 1:
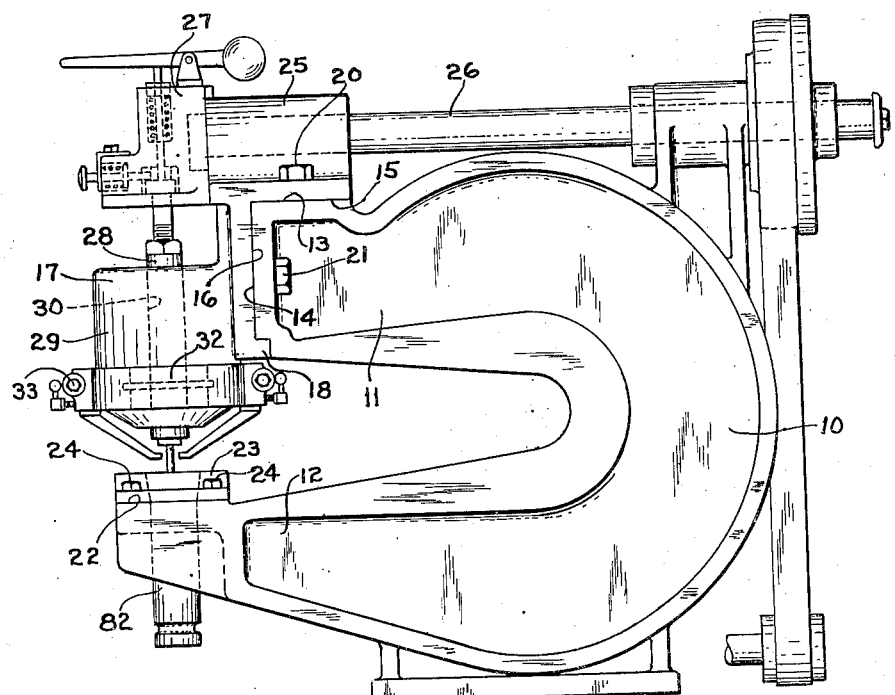
Figure 13:
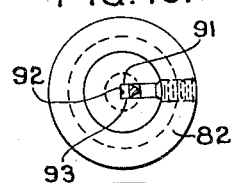
Figure 15:
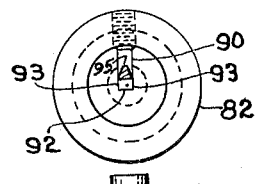

Fig. 1 is a side elevation of my improved machine;

Figs. 2 to 5, inclusive, are detail views showing head, tool holding, stripper and ram features;

Figs. 6 to 11, inclusive, are detail views showing features of the novel tool and its cutting relation;

Figs. 12 to 15, inclusive, are detail views pertaining to the die holder; and

Figure 16:
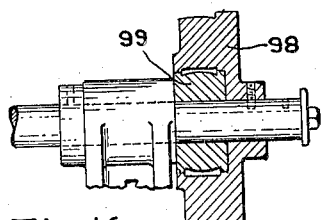
Figure 12:
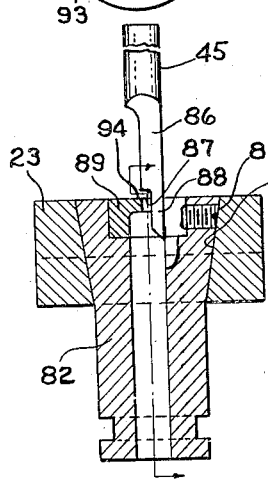
Figure 14:
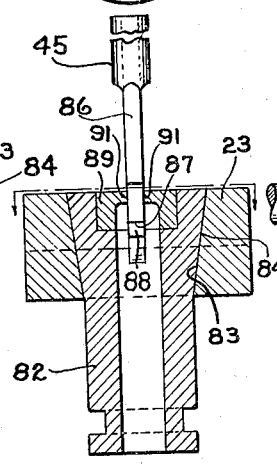
Figures 17, 18:
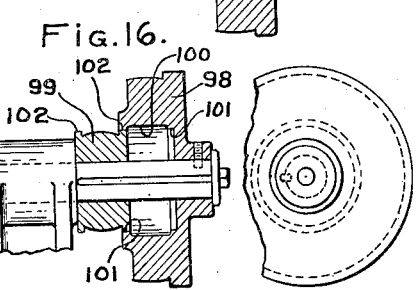

Figs. 16, 17, and 18 are detail views showing the two-speed pulley.

Referring to the drawings more in detail, the frame 10 is provided with horizontal upper and lower arms 11 and 12, respectively.

The outer end of the upper arm 11 terminates short of the outer end of the lower arm 12 to provide for the outer end of the upper arm carrying a separate head with the ram alined with the die holder carried by the lower arm. To this end, the upper arm is provided with a top horizontal seating face 13 and an end vertical seating face 14 against which are respectively seated the horizontal and vertical faces 15 and 16 of the head 17. Also, the head 17 is preferably formed with a flange 18 engaging underneath the outer end of the upper arm, whereby a tongue-and-groove relation is established between the head and the upper arm to hold the head in place vertically with respect to the upper arm. The head is fastened to the upper arm by the screws 20 and 21.

The lower arm 12 is formed with a horizontal seating face 22 for the die support 23 held in place by the screws 24.

Thus it will be seen that the only accuracy required in the manufacture of the frame is in connection with provision of the seating faces and this may be readily done in the ordinary machine shop, whereby the frame may be provided locally and other parts requiring more careful design and manufacture shipped, if shipping charges make this advantageous. Furthermore, separateness of construction makes possible a wide range of machine sizes with a minimum number of frames, it being possible to use different types and sizes of heads and die structures with a given frame.

The head 17 is provided with a horizontal bearing 25 for the drive shaft 26 and with a housing 27 for mechanism for converting rotary motion of the drive shaft into reciprocatory motion of the ram 28. Mechanism of this character is shown more in detail in my patent aforesaid. Below the housing 27, the head is formed with a vertical body 29 having a vertical bore 30 for the ram 28.

The lower end of the body 29 is formed with a bearing 31 for the multi-part swivel ring 32, the parts of the latter being held together by bolts or screws 33. From Fig. 2, it will be seen that the swivel ring is held in horizontal position and against vertical displacement with respect to the head by the annular tongue-and-groove connection at 34.

The swivel ring 32 has connected thereto a key 36 extending immediately underneath the lower end of the body 29 and engaging a vertical groove 37 formed in the ram. By manually turning the swivel ring, the ram is turned through the intermediation of this slidable key or spline connection, structure and means being provided permitting of the ram being reciprocated and turned as more fully disclosed in my patent aforesaid.

The ram 28 is provided with a bore having portions 39, 40, and 41 of successively greater diameter, the portion 40 being internally threaded. The bore provides a downwardly-facing ram abutment surface 42.

A holder 43, preferably in the form of a sleeve, fits the interior of the upper bore portion 39, and it is preferably engaged by a set screw 44 carried by the ram.

A punch tool 45 fits the interior of the holder and means is provided for securing relative axial adjustment of the tool relatively to the latter. Preferably, the holder sleeve 43 is provided with a plurality of openings 46 distributed therealong and with any one of which a notch 47 in the upper portion of the tool is adapted to register. A connecting pin 48 is arranged in the registering opening and notch.

Cutting thrust on down strokes of the ram is transmitted from the abutment surface 42, through adjustable spacing means, to the top end of the tool, the latter being relieved, as shown at 50, to avoid the imposition of compressive stress on the tool material over the notch. The spacing means may be of any suitable type, for example, I show a series of elements 51, 52, and 53, the elements 52 and 53 being of lengths suitable to the tool length.

Collet mechanism is connected to the ram and engages the tool to center and grip the latter, the mechanism including an inner member 54 and an outer sleeve member 55. The inner member 54 is segmented in the usual way, either by the provision of slits or by the provision of separate segments, to provide for circumferential gripping of the tool.

The outer sleeve member 55 has threads at its upper end for engagement with the threaded portion 40 of the bore and the portion of the sleeve member 55 below the threads engages the lowermost bore portion 41 to provide for piloting of the outer sleeve member 55 with respect to the ram, whereby absolute co-axial relation thereof is maintained.

The inner and outer members 54 and 55 are provided with engaging, downwardly-converging conical surfaces 57 and 58, respectively, and the inner member is provided with a tool-engaging cylindrical surface 59. The bore portion 41, the lower portion 56 of the outer sleeve member 55, the engaging conical surfaces 57 and 58, and the cylindrical surface 59 are all co-axial, so that, when the outer sleeve member 55 is screwed up, not only is the tool gripped but it is centered with respect to the ram. The upper end of the inner member 54 abuts the lower end of the holding sleeve 43, thereby limiting upward motion of the inner member to insure contraction of the latter and to take up any end play and assure a tight stripping connection from the ram, through the pin 48, to the tool 45.

The apparatus just described for connecting the tool to the ram is arranged almost entirely within the ram and it does not extend beyond the cylindrical confines of the latter, with the result that minimum overhang of the tool below the ram exists and with the further result that the lower end of the ram may be located quite close to the lower end of the body 29, the latter result being aided by the special structure of the spline connection including the key 36 and the groove 37, the groove opening through the lower end of the ram and being largely in the cylindrical surface which engages the ram guide bore. In other words, common structure is present for guiding and turning the ram, and this makes possible a more compact relation vertically as well as the location of the lower end of the ram quite close to the lower end of the body portion 29 of the head 17.

The swivel ring 32 also carries one or more strippers 61, preferably a pair of opposed strippers. Each stripper has a body portion 62 provided with a downwardly-extending arm 63, and the arms 63 extend inwardly to provide stripping portions 64 arranged closely adjacent to the tool in the manner more particularly hereinafter pointed out.

The strippers are mounted so that they may be adjusted vertically suitably to the thickness of material being cut and also so that they may be swung out of the way of the tool to permit adjustment or replacement of the latter. In Figs. 3 and 4, the normal position of the strippers is shown in full lines and the out-of-the-way position in dot-and-dash lines.

Vertical adjustment of the strippers are secured by the screws 65 having necks 66 arranged in the slots 67 formed in the bodies 62 and having flanges 68 and 69 engaging the upper and lower surfaces of the bodies 62, whereby the strippers may be raised and lowered.

To provide for swinging of the strippers to out-of-the-way position, the bodies 62 are provided with vertical cylindrical studs or pivots 70 arranged in vertical smooth bores 71 in the swivel ring. If the pivots are free to turn, the strippers may be swung out.

The strippers are held in normal position by the clamping screws 72. After the latter are tightened to clamp the pivots 70, the weighted arms 73 are threaded or turned thereon to the approximate positions shown and then clamped by the jamb nuts 74, the weighted arms providing gravity forces tending to tighten the screws 72 and preventing loosening of the latter.

The tool 45 has a lower face 75 intersecting the cylindrical surface to define the arcuate cutting edge 76 extending from one side to the other of the pilot 77 depending below the face 76. The pilot is defined by converging side faces 78 meeting to provide a front cutting edge 79 and by a back face 80, which is a cylindrical element continuous with the tool cylindrical surface. The faces 78 and 80 meet to provide lateral side edges 81. The tool is positioned so that the side edges 81 are disposed adjacent to the stripping portions to expose to view the front cutting portion of the tool; and, as the ram and the strippers turn together through the intermediation of the swivel ring, maintenance of this positional relation is assured so that the cutting parts and the line to be followed are always in full view.

The form of pilot shown is advantageous from several points of view. A blank may be fed to the tool through a wide angular range without decreasing the bite. After cutting a slug, the blank is fed forward until the curved end of the slot contacts with the front edge 79, whereby the extent of feed is limited. The front edge 79 is capable of functioning in this way with feeding of material through a wide angular range until such edge and one of the side edges 81 engage the blank without diminution of the bite or extent of feed. In Figs. 8 to 11, inclusive, the extent of feed or bite is indicated by the crescent $a$. In Fig. 10, it is assumed that the blank has been fed forward but that cutting has not started, the crescent $a$ indicating the amount the tool overlaps the blank when fed forward and is limited by the front edge 79. Fig. 11 shows the effect of slug spreading incident to cutting, the spread being indicated by the crescent $b$. From Figs. 8 and 9, it will be evident that the front edge 79 is capable of functioning as a feed limiting edge through a wide range of angular feed without diminishing the bite—the crescent a. The angular range for the front edge 79 acting alone as a feed limiting feature is limited by the cut edge of the slot also engaging one of the edges 81; and thereafter, as an edge 81 functions as a limiting edge, the bite is reduced. The normal bite may be had through an angle defined approximately by normals to the faces 78.

In addition to the front edge 79 functioning as a feed limiting feature, it also functions to partially cut the slug, as shown in Figs. 8, 9, and 10, wherein such cut extends through the spread crescent b. As soon as spreading starts, the edge begins to cut; and cutting proceeds to the extent of spreading, whereby the tool is relieved of the force of spreading.

The pilot is approximately triangular in cross section, and the edges 79 and 81 are at the apices of such section. The edges 81 function one at a time with the front edge 79 when the direction of feed is at a considerable angle. The edges 81 never function together as guide edges. Thus it will be seen that the shape of the pilot provides for the operations referred to, and it should be emphasized that the triangular cross section gives adequate side clearance for slug spreading over a wide angular range of feeding. The triangular cross-sectional area of the pilot diminishes from the cutting face downwardly to facilitate cutting and to provide for ready disengagement of cut slugs.

I prefer to use a die holder 82 having a downwardly-tapered surface 83 arranged to fit the tapered seat 84 formed in the support 23, the seat 84 being in axial alinement with the ram and the tool. The holder 82 is accessible from below the lower arm 12 to permit of ready loosening of the tapered seating surfaces to provide for turning of the die. Turning of the die is effected by the tool, if the latter and the die opening are non-circular. If a round tool is used, the holder must be turned; and turning as occasion may require is advantageous in presenting a fresh cutting edge of the die, it being remembered that, with tools of the type herein described, only a portion of the die edge is effective in making a cut.

In Figs. 12 to 15, inclusive, I show a flat form of tool 86 having a square-edged cutting portion 87 and a back pilot 88. The tool fits the die 89 having a die opening 90 constituted by a milled slot extending slightly beyond the axis. The cutting portion 87 is defined by parallel side cutting edges 91 and a front cutting edge 92 extending normally with respect to the edges 91. Likewise, the die has parallel side cutting edges 93 and a front cutting edge 94 extending normally with respect to the edges 93. The pilot is rounded or relieved at the back, as indicated at 95, to make possible short radius cuts. The tool and the die are so arranged that the front cutting edges 92 and 94 are approximately at or only a slight distance forward of the ram axis, whereby, if there is any slight turning of the tool with respect to the die, the cutting edges of the tool are not moved or displaced sufficiently to overlap the die and so cause fouling.

The flat form of tool, shown in Figs. 12 to 15, inclusive, is advantageous in cutting light gauge material for the following reasons: the machine may be increased in speed and cutting hastened; square cuts and cuts with square corners may be made; and cuts close to corners may be made.

In Figs. 16, 17 and 18, I show a two-speed pulley arrangement for driving the machine, the larger pulley 98 being used for low-speed operation of the machine when cutting heavier materials with the round form of tool and the small pulley 99 being used for high-speed operation of the machine when the flat form of tool is used to cut light gauge material. When the larger pulley 98 is used, the pulleys 98 and 99 are disposed in nested relation, as shown in Fig. 16, the pulley 98 being recessed at 100 to provide a chamber or pocket for the smaller pulley. Annular seats 101 are preferably provided at either end of the recess 100 adapted to fit annular seats 102 formed on the smaller pulley. The larger pulley 98 is supported in part by the smaller pulley 99, whether the larger pulley be nested thereover, as shown in Fig. 16, or be displaced to expose the smaller pulley, as shown in Fig. 17, for, in either case, the left-hand annular seat 101 of the larger pulley fits one of the seats 102 of the smaller pulley.

What I claim is:

1. In a cutting machine of the reciprocatory punch type, a frame having horizontal upper and lower arms, a head carried by the upper arm and having a vertical circular guide bore, a turnable and reciprocatory ram fitting the guide bore and having its lower end disposed closely adjacent to the lower end of the guide bore, said ram having a vertical spline groove opening through the external cylindrical guide bearing surface thereof and extending through its lower end and said ram having a vertical bore opening through the lower end thereof, a tool of the punch type disposed coaxially of the ram bore, detachable means arranged internally of the ram bore and providing for connection of the tool to the ram and for vertical adjustment of the tool relatively to the ram, a die carried by the lower arm and cooperating with the tool, a horizontal adjusting ring swivelled to the head, means depending from the ring and extending inwardly horizontally closely adjacent to the lower end of the head and provided with a key engaging said spline groove, and stripping means carried by the ring for cooperation with the tool.

2. In a machine of the reciprocatory punch type, a frame having horizontal upper and lower arms, a head carried by the upper arm and having a vertical cylindrical guide bore, a turnable and reciprocatory ram fitting the guide bore and having a tool connected to the lower end thereof, said tool having a front cutting portion and a back pilot portion, a horizontal swivel ring carried by the lower end of the head, means providing a slidable spline connection between the swivel ring and the ram, a pair of opposed strippers having stripping portions disposed adjacent to the side edges of the tool pilot portion, and means for connecting the strippers to the swivel ring and providing for swinging of the stripping portions away from the tool to render the latter accessible incident to adjustment and replacement of the tool.

3. In a cutting machine of the reciprocatory punch type, a frame having horizontal upper and lower arms; a head carried by the upper arm and having a vertical cylindrical guide bore; a turnable and reciprocatory ram fitting the guide bore; a tool of the punch type connected to the lower end of the ram; a die carried by the lower arm and cooperating with the tool; said tool having front cutting and back pilot portions; a horizontal swivel ring carried by the lower end of the head; means providing a slidable spline connection between the swivel ring and the ram; said swivel ring having vertical parallel bores one of which is smooth and the other of which is threaded; a stripper embodying a horizontal body portion, an arm extending downwardly and inwardly to provide a stripping portion normally adjacent to the die and the cutting portion of the tool, a vertical pivot extending upwardly from the body portion and fitting said smooth bore, and an arcuate slot concentric with the pivot and opening through one edge of the body portion; a screw engaging the threaded bore and having a neck engaging in said arcuate slot; and a locking screw carried by the swivel ring and engaging said pivot.

4. The combination as claimed in claim 3 with an adjustable weighted arm carried by the locking screw and arranged so that the gravity force thereof tends to tighten the locking screw, whereby loosening of the latter is prevented.

5. In a cutting machine of the reciprocatory punch type, a vertical ram having a vertical bore opening through the lower end thereof and providing an upper thrust abutment surface; said bore having cylindrical portions which are of successively larger diameters in a downward direction and the intermediate bore portion being internally threaded; a tool disposed in the bore; holding means for the tool arranged internally of the bore and providing for vertical adjustment of the tool relatively to the ram; adjustable spacing means for transmitting cutting thrust from said thrust abutment surface to the upper end of the tool; and collet mechanism embodying an inner element and an outer sleeve element with downwardly-converging conical engaging surfaces therebetween, said inner element engaging the tool circumferentially and said sleeve element having upper threads engaging the bore threads and a lower external cylindrical surface fitting the lowermost bore portion, said conical surfaces and the tool-engaging surface of the inner member being coaxial with the external cylindrical surface of the outer sleeve element.

6. In a cutting machine of the reciprocatory punch type; a vertical ram having a vertical bore opening through the lower end thereof and providing an upper thrust abutment surface; said bore having cylindrical portions which are of successively larger diameter in a downward direction; an intermediate portion of the bore being internally threaded; a sleeve in the bore and fitting the upper portion of the latter; a tool telescopically arranged with respect to the sleeve and having its lower cutting portion depending below the latter; means for connecting the tool to the sleeve and providing for relative axial adjustment thereof; adjustable spacing means between said thrust abutment surface and the top end of the tool; and collet mechanism including an inner contractible element and an outer sleeve element having engaging downwardly-converging surfaces, said inner element circumferentially engaging the tool and abutting the lower end of said sleeve and said outer sleeve element telescoping over the lower end portion of said sleeve, having its upper end portion threaded to said bore threads and the cylindrical portion therebelow fitting the lowermost bore portion and said conical surfaces being coaxial with said lower cylindrical portion of the outer sleeve element.

7. In a cutting machine of the reciprocatory punch type, a frame having horizontal upper and lower arms, a head carried by the upper arm and having a circular guide bore, a turnable and reciprocatory ram in the guide bore, a tool carried by the lower end of the ram and having front cutting and back pilot portions, a die cooperating with the tool, a swivel ring carried by the head and having a slidable key connection with respect to the ram, a holder for said die carried by the lower arm, said die holder and the lower arm having cooperating surfaces which provide a thrust abutment relation between the die holder and the lower arm and for holding of the die holder centered with respect to the ram and which provide for turning of the die holder relatively to the lower arm when the die holder is loosened with respect to the latter, and means for loosening the die holder with respect to the lower arm to provide for turning thereof about the ram axis.

8. The combination as claimed in claim 7 wherein the tool and die are non-circular and the die is turned from the tool after loosening of the die holder.

9. In a cutting machine of the reciprocatory punch type, a reciprocatory ram means for turning the ram about its longitudinal axis, a flat tool carried by the ram and having a front cutting portion and a back pilot portion, and a die cooperating with the tool, said tool being constructed and arranged so that its front cutting edge is disposed adjacent to the ram axis to minimize fouling of the die by the cutting portion incident to relative turning of the tool with respect to the die.

10. In a cutting machine of the reciprocatory punch type, a cylindrical tool having a lower face and a pilot depending from the latter, said face intersecting the tool cylindrical surface to define an arcuate cutting edge extending from one side of the pilot to the other and the pilot being defined by relatively inclined side faces which meet at the front to provide a sharp feed-limiting edge.

11. In a cutting machine of the reciprocatory punch type, a cylindrical tool having a lower front cutting face bounded by an arcuate cutting edge and by a back pilot extending below the cutting face, said pilot being substantially triangular in cross-section in planes normal to the tool axis with two angles of each cross-section at the cylindrical boundary surface of the tool and with the third angle thereof disposed forwardly of the first two in the direction of the center of the cutting edge.

12. The combination as claimed in claim 11 wherein the cross-sectional area of the pilot normal to the tool axis diminishes from the cutting face downwardly.

CHARLES B. GRAY.